US008623211B2

(12) United States Patent
Yamane et al.

(10) Patent No.: US 8,623,211 B2
(45) Date of Patent: Jan. 7, 2014

(54) FILTERING AND CONDENSING APPARATUS OF SUCTION TYPE

(75) Inventors: Hiroyasu Yamane, Minato-ku (JP); Tadashi Kunitani, Minato-ku (JP); Eiji Sakai, Minato-ku (JP)

(73) Assignee: Metawater Co., Ltd., Tokyo (JP)

( * ) Notice: Subject to any disclaimer, the term of this patent is extended or adjusted under 35 U.S.C. 154(b) by 311 days.

(21) Appl. No.: 12/442,393

(22) PCT Filed: Feb. 18, 2009

(86) PCT No.: PCT/JP2009/000676
§ 371 (c)(1),
(2), (4) Date: May 9, 2011

(87) PCT Pub. No.: WO2010/035362
PCT Pub. Date: Apr. 1, 2010

(65) Prior Publication Data
US 2011/0259806 A1      Oct. 27, 2011

(30) Foreign Application Priority Data

Sep. 25, 2008   (JP) ................................ 2008-246273

(51) Int. Cl.
*B01D 25/02*  (2006.01)
*B01D 29/07*  (2006.01)
*B01D 29/13*  (2006.01)
*B01D 29/52*  (2006.01)
*C02F 11/02*  (2006.01)

(52) U.S. Cl.
USPC .............. 210/323.1; 210/321.75; 210/321.84; 210/445; 210/416.3; 210/406; 210/231

(58) Field of Classification Search
USPC ........... 210/224–231, 416.1, 416.3, 455, 445, 210/406, 457, 459, 460, 461, 462, 463, 483, 210/486, 487, 488, 493.1, 493.3, 493.5, 210/321.75, 321.84, 321.77, 321.86, 323.1
See application file for complete search history.

(56) References Cited

U.S. PATENT DOCUMENTS 2,821,305 A * 1/1958 Anderson ..................... 210/455
3,289,844 A * 12/1966 Emele ........................... 210/225

(Continued)

FOREIGN PATENT DOCUMENTS

CN          1517142 A     8/2004
JP       61153110 A  *  7/1986

(Continued)

OTHER PUBLICATIONS

English language machine translation of JP 2006-218455 A.*
English language machine translation of JP 2008-12443 A.*

*Primary Examiner* — David C Mellon
(74) *Attorney, Agent, or Firm* — Law Office of Katsuhiro Arai (57) ABSTRACT

A filtering and condensing apparatus of a suction type includes: a sludge tank for containing sludge to be filtered and condensed; a plurality of filtering plates aligned with each other so as to be disposed to be adjacent to each other in the sludge tank; a means for constantly applying a tension force to each of the filtering plates, which means is disposed to be over a periphery of each filtering plate. A filtering cloth of each filtering plate is divided in the lateral direction by a plurality of vertically extending seams to form multiple divided zones, in each of which zone a filtering chamber is formed. A weight member is attached to a lower portion of each filtering plate using a U-shaped body.

8 Claims, 6 Drawing Sheets

(56) References Cited

U.S. PATENT DOCUMENTS

| | | | |
|---|---|---|---|
| 3,669,273 A * | 6/1972 | Kurita | 210/225 |
| 3,784,019 A * | 1/1974 | Gordon, III | 210/486 |
| 4,081,380 A * | 3/1978 | Johnson | 210/225 |
| 4,491,519 A * | 1/1985 | Kurita | 210/225 |
| 5,449,468 A * | 9/1995 | Trummel | 210/770 |
| 5,843,310 A * | 12/1998 | Tsuchida et al. | 210/225 |
| 2008/0029451 A1 * | 2/2008 | Chisholm et al. | 210/459 |
| 2008/0277330 A1 * | 11/2008 | Esser et al. | 210/225 |

FOREIGN PATENT DOCUMENTS

| | | |
|---|---|---|
| JP | 10-156107 A | 6/1998 |
| JP | 2002-219324 A | 8/2002 |
| JP | 2005-138064 A | 6/2005 |
| JP | 2005-169388 A | 6/2005 |
| JP | 2006-218455 A | 8/2006 |
| JP | 2006-289241 A | 10/2006 |
| JP | 2008-012443 A | 1/2008 |

* cited by examiner

FILTERING AND CONDENSING APPARATUS OF SUCTION TYPE

This application is the U.S. National Phase under 35 U.S.C. §371 of International Application PCT/JP2009/000676, filed Feb. 18, 2009, which claims priority to Japanese Patent Application No. 2008-246273, filed Sep. 25, 2008. The International Application was published under PCT Article 21(2) in a language other than English.

TECHNICAL FIELD

The present invention relates to a filtering and condensing apparatus of a suction type, and, in particular, relates to such an apparatus which is capable of improving the filtering efficiency by securing the filtering area, while at the same time keeping an integrity of the filtering cloth.

BACKGROUND OF THE INVENTION

Conventionally, a filtering and condensing apparatus of a suction type has been adopted in order to condense agglomerated sludge generated at a water purification plan, for instance. One example of such an apparatus is disclosed by Japanese Patent Publication HEI03-23203.

This filtering and condensing apparatus comprises a sludge tank for containing sludge which is to be filtered and condensed, and a plurality of filtering plates disposed to be adjacent to each other so as to be aligned with each other in the sludge tank, each of which extends in a vertical direction of the sludge tank. Each of the filtering plates includes a supporting plate and a filtering cloth in a bag form which is integrally sewed on the supporting plate and houses the supporting plate to form a filtering chamber therein. A fixing frame is provided so as to surround each of the filtering plates. A filtrate discharging tube is communicated with the filtering chamber in order for the filtrate to be discharged through the filtering chamber. In addition, a suction portion for sucking the filtering cloth through the filtering chamber and an expansion portion for expanding the filtering cloth through the filtering chamber are provided, and coil springs for constantly exerting a tension force on each of the plurality of the filtering plates is disposed to be around the periphery of each of the filtering plate.

According to the above structure of the filtering and condensing apparatus, in case of filtering, a sludge in the sludge tank is sucked and thus filtered by the filtering cloths, so that the condensed sludge is deposited on the outer surfaces of the filtering cloths, while the filtrate which has passed through the filtering cloths and thus guided into the filtering chambers can be recovered outside of the sludge tank through the filtrate discharging tube.

On the other hand, in a case where the condensed sludge is recovered, the filtering cloths are expanded by supplying a compressed air to inner surfaces of the filtering cloths through the filtering chambers, whereby the condensed sludge deposited on the outer surfaces of the filtering cloths is separated, so that the condensed sludge deposited on the bottom of the sludge tank is discharged, and as a result, it can be incinerated or reclaimed as a cake by mechanically hydrating the discharged condensed sludge. It is possible to alleviate the load of the energy needed for the mechanical hydrating treatment such as pressurizing or depressurizing, etc. by said filtering and condensing of sludge.

In a case where the sludge is filtered or where the filtering cloth is expanded, since a tension force is constantly applied to each of the filtering plates by the coil springs provided on the periphery thereof, each of the filtering plates is maintained to be stable, even if each of the filtering plates flutters or swings to contact the adjacent filtering plate due to the suction force upon the filtering, or the air fed into the filtering chamber upon the expansion of the filtering cloth, whereby technical problems in which the filtering area is substantially reduced, or the condensed sludge deposited on the outer surface of the filtering cloth is separated can be prevented.

However, the following technical problems are caused in relation to a case where such a conventional filtering and condensing apparatus of suction type is made large-sized.

Firstly, in a case where the total filtering area of the filtering plates disposed within the sludge tank including a limited space is obtained when the filtering and condensing apparatus of the suction type is made large-sized, it is desired to increase the number of the filtering plates within the sludge tank as many as possible, while at the same time to maximize the filtering area of a single filtering plate. In order to do that, it is necessary to increase the filtering area by making the filtering cloth large, while to make the distance between the adjacent filtering plates as short as possible. However, even if the filtering plate can be maintained to be stable by the coil spring, the bigger the filtering cloth becomes, the larger the amount of the protrusion of the filtering plate toward the adjacent filtering plate becomes, whereby a risk that the filtering plate can contact the adjacent filtering plate is increased. On the other hand, in a case where the amount of the protrusion is limited, there occurs a risk that the filtering cloth is caused to be unduly tensioned due to the expansion of the filtering cloth, so that the normal filtering function cannot be attained, or the filtering cloth can be broken or torn, due to the fact that the fine holes of the filtering cloth are forced to be enlarged.

Secondly, in a case where the filtering cloth is integrally sewed on the corresponding supporting plate, when the filtering cloth is expanded in order to separate the condensed sludge therefrom, the supporting plate is forced to be contracted in the lateral direction (the direction substantially perpendicular to the vertical direction in which the sludge tank extends) upon the expansion of the filtering cloth, whereby the coil springs provided on both sides of the corresponding filtering plate are caused to be extended, so that the tension force by the coil springs is increased. If the coil springs are selected in accordance with such an increase of the tension force, the coil springs are caused to be contracted upon the filtering, on the contrary, whereby the tension force is caused to be decreased, so that there occurs a risk that the adjacent filtering plates can contact each other, while each of the filtering plate can flutter. The amount of such contraction of the supporting plate becomes inevitably large as the filtering plate becomes large.

Thirdly, in a case where the filtering cloth is immersed into the sludge for a long time, the filtering cloth made of a chemical fiber is caused to be swollen, whereby the corresponding supporting plate is caused to be extended, and as a result, the coil springs provided on both side of the filtering plate are caused to be contracted, causing the tension force by the coil springs to be decreased to generate the slackening of the filtering cloth. The amount of such an extension of the supporting plate becomes inevitably large, as the filtering plate becomes large.

Such being the case, even if the constant tension force is tried to be applied to the filtering plate by means of the coil springs based on the case of the filtering, the tension force is caused to be decreased due to the expansion of the filtering cloth, On the other hand, the tension force is caused to be increased due to the swelling of the filtering cloth, and such a fluctuation of the tension force becomes inevitably large, as the filtering and condensing apparatus of the suction type becomes large. The length of the coil spring may be lengthened in order to absorb such fluctuation of the tension force, however, the decrease of the filtering area in a limited space within the sludge tank is caused. In addition, the rigidity of the coil spring may be enhanced, however, the contraction of the supporting plate due to the expansion of the filtering cloth is restricted, whereby the filtering cloth is not fully expanded, so that the degree of the separation of the condensed sludge deposited on the filtering cloth is worsened, or the tension force is lost due to the fact that the coil spring remains fully extended because of the plastic deformation of the coil spring which is caused by the tension force being overcome by the expanding force of the filtering cloth.

In this respect, the coil springs used in the sludge for a long time may be preferably made of steel use stainless (SUS) which is an expensive and good corrosion resistant material, and may be standard products, not made-to-order products in a case where the filtering and condensing apparatus of the suction type is made large-sized, in view of the fact that tens of the coil springs are provide around the periphery of the filtering plate, and tens of the filtering plates are used.

SUMMARY OF THE INVENTION

In view of the above technical problems, an object of the present invention is to provide a filtering and condensing apparatus of the suction type which is capable of improving the filtering efficiency by securing the filtering area, while at the same time keeping an integrity of the filtering cloth.

In view of the above technical problems, another object of the present invention is to provide a filtering and condensing apparatus of the suction type which is capable of maintaining a tension force applied to a filtering plate to be substantially constant, while at the same time adopting standard coil springs made of steel use stainless (SUS), in a case where said filtering and condensing apparatus of the suction type is made large-sized.

In view of the above technical problems, according to an aspect of the invention, there is provided a filtering and condensing apparatus of a suction type comprises a sludge tank for containing sludge to be filtered and condensed, and a plurality of filtering plates aligned with each other so as to be disposed to be adjacent to each other in the sludge tank, each plane portion of which extends in the vertical direction, each of the filtering plates includes a supporting plate in the form of a net, and a filtering cloth in a bag form so as to be integrally sewed on the supporting plate and to house said supporting plate, whereby a filtering chamber is formed inside the filtering cloth, and said apparatus further includes a means for sucking said filtering cloth through said filtering chamber, a means for expanding said filtering cloth through said filtering chamber, and a means for constantly applying a tension force to each of the filtering plates which is disposed to be over the periphery of each of the plurality of the filtering plates, characterized in that each of said filtering cloths are divided in the lateral direction of the corresponding filtering plate by a plurality of vertically extending seams to form said filtering chamber at every divided zone, the lateral length of a portion of each of said filtering cloths divided by the adjacent seams is set to be longer than the lateral length of a portion of the supporting plate corresponding to the corresponding zone over the entire vertical direction, whereby each of said zones includes an expanding margin upon the expansion of the corresponding filtering cloth.

According to the above filtering and condensing apparatus of the suction type, by sucking and thus filtering the sludge contained in the sludge tank through the filtering cloths, water contained in the sludge passes through the filtering cloths, and thus guided into the filtering chambers, while the sludge is filtered and thus condensed by the dehydrated sludge being deposited on the outer surface of the filtering cloths. In this case, since a tension force is always applied to each of the plurality of the filtering plates from its periphery by a means for applying a tension force, each of the filtering plates is maintained to be stable, ands thus, in case of suction, for instance, the condensed sludge deposited on the filtering cloths can be prevented from being naturally separated by the fluttering of the filtering plate, or the formation of the condensed sludge can be prevented from being blocked or the effective filtering area can be prevented from being decreased by the contact of the adjacent filtering plates.

In order to separate the condensed sludge from the filtering cloth, in a case where the filtering cloth is expanded, since the filtering cloth is divided in the lateral direction of the filtering plate, the amount of the protrusion of the expanding portion toward the adjacent filtering plate can be restricted due to the fact that the filtering cloth is expanded at each divided zone, whereby, as compared with the case where the filtering cloth is not divided, the adjacent filtering plates can be disposed to be closer to each other, and as a result, the total filtering area constituted by the plurality of the filtering plates can be maximized.

In such a case, since the expanding margin is provided at every divided zone, in a case where the filtering cloth is expanded, the normal filtering function can be prevented from being lost, or the filtering cloth can be prevented from being broken or torn due to the fact that the filtering cloth is unduly tensioned to enlarge fine holes of the filtering cloth. As such, the filtering efficiency can be improved, while at the same time an integrity of the filtering cloth can be maintained.

According to a preferred configuration, said means for constantly applying a tension force to each of the filtering plates from its both sides consists of an elastic member extending in its lateral direction, said supporting plate is made of a rigid material which causes substantially no extension in its plane due to the immersion of the filtering cloth into the sludge and substantially no contraction in its plane due to the expansion of the filtering cloth, and causes no substantial deformation so as to deteriorate a flatness of the supporting plate due to said immersion and said expansion of the filtering cloth.

According to the filtering and condensing apparatus of the suction type of the present invention, since the filtering cloth is integrally sewed on the corresponding supporting plate, a compressive force in the lateral direction of the supporting plate is applied to the supporting plate when the filtering cloth is expanded. However, since the supporting plate is made of a rigid material which causes substantially no contraction in its plane, and substantially no deformation so as to deteriorate its flatness due to the expansion of the filtering cloth, the length of the supporting plate can be maintained to be substantially constant without causing the lateral contraction due to such a compressive force. Accordingly, since the length of the elastic member also remains unchanged, the tension force by the elastic member can be maintained to be substantially constant, so that the contact of the adjacent filtering plates or the fluttering of the filtering plate due to the decrease of the tension force caused by the extension of the elastic member can be prevented.

On the other hand, in a case where the filtering cloth is swollen due to the fact that the filtering cloth is immersed into the sludge for a long time, a tension force is applied to the supporting plate in its lateral direction due to the expansion of the filtering cloth. However, since the supporting plate is made of a rigid material which causes substantially no extension in its plane, and substantially no deformation so as to deteriorate its flatness due to the immersion of the filtering cloth into the sludge, the length of the supporting plate can be maintained to be substantially constant without causing the lateral extension due to such a compressive force. Accordingly, since the length of the elastic member also remains unchanged, the tension force by the elastic member can be maintained to be substantially constant, so that the enlarging of the fine holes of the filtering cloth or the break of the filtering cloth due to the increase of the tension force caused by the contraction of the elastic member can be prevented.

In particular, in a case where the filtering and condensing apparatus of the suction type is made large-sized, the fluctuation of the tension force applied to the supporting plate upon the filtering is inevitably increased. However, by utilizing cheap standard elastic members without a need to prepare for expensive made-to-order elastic members, the plurality of filtering plates can be disposed to be as close as possible to each other, while the filtering area of each of the filtering plates can be maximized and the fluctuation of the tension force applied to the filtering plate upon the filtering can be restricted, whereby the above technical problems caused by the expansion of the filtering cloth or the immersion of the filtering cloth for a long time can be solved.

According to a preferred configuration, the negative pressure caused by said sucking means is set to be less than the predetermined value in such a way that a wrinkled portion of the filtering cloth which is not adhered to the filtering cloth and is formed based on said expanding margin upon filtering does not deteriorate an integrity of the filtering cloth.

According to a preferred configuration, a filtering frame is provided around the outer periphery of the corresponding filtering plate so as to surround the filtering plate, and an upper portion of each of the filtering cloths are suspended and supported from an upper portion of the corresponding filtering frame.

According to a preferred configuration, a weight member is provided on a lower portion of each of the filtering cloths so as to apply a tension force in the downward direction thereto.

According to a preferred configuration, the lateral length of said divided zone of each of the filtering cloths is determined in accordance with the amount of the protrusion of the filtering plate toward the adjacent filtering plate upon the expansion of the filtering cloth, and the distance between the adjacent filtering plates.

According to a preferred configuration, said supporting plate is made of polyethylene.

According to a preferred configuration, said supporting plate is made of ethylene vinyl acetate (EVA).

According to a preferred configuration, said elastic member consists of a coil spring made of steel use stainless (SUS).

In view of the above technical problems, according to an aspect of the invention, there is provided a filtering and condensing apparatus of a suction type comprising a filtering and condensing tank for containing a liquid including material to be filtered and condensed, and a plurality of filtering plates aligned with each other so as to be disposed to be adjacent to each other in the filtering and condensing tank, each plane portion of which extends in the vertical direction, each of the filtering plates includes a supporting plate in the form of a net, and a filtering cloth in a bag form so as to be integrally sewed on the supporting plate and to house said supporting plate, whereby a filtering chamber is formed inside the filtering cloth, and said apparatus further includes a means for sucking said filtering cloth through said filtering chamber, a means for expanding said filtering cloth through said filtering chamber, and a means for constantly applying a tension force to each of the filtering plate which is disposed to be over the periphery of each of the plurality of the filtering plates, characterized in that each of said filtering cloths are divided in the lateral direction of the corresponding filtering plate by a plurality of vertically extending seams to form said filtering chamber at every divided zone, the lateral length of a portion of each of said filtering cloths divided by the adjacent seams is set to be longer than the lateral length of a portion of the supporting plate corresponding to the corresponding zone over the entire vertical direction, whereby each of said zones includes an expanding margin upon the expansion of the corresponding filtering cloth.

EFFECT OF THE INVENTION

According to the filtering and condensing apparatus of a suction type of the present invention, in a case where the material to be treated contained in the liquid is filtered and condensed via the filtering cloth integrally sewed on each of the supporting plates disposed in the filtering and condensing tank, the filtering cloth can be prevented from being broken or torn due to the fact that the filtering cloth is unduly tensioned to enlarge fine holes of the filtering cloth, since the filtering cloth is divided in the lateral direction of the filtering plate by the plurality of vertically extending seams on the filtering cloth and the expanding margin is provided at every divided zone in order to separate the condensed sludge from the filtering cloth, while at the same time, the adjacent filtering plates can be disposed to be closer to each other, since the amount of the protrusion of the expanding portion toward the adjacent filtering plate can be restricted, whereby the filtering efficiency can be improved, while at the same time an integrity of the filtering cloth can be maintained.

DETAILED DESCRIPTION OF EMBODIMENTS OF THE INVENTION

The first embodiment in which sludge generated at a sewage disposal plant or a water purification plant is to be filtered and condensed will be described in detail with reference to the drawings.

Figure 1:
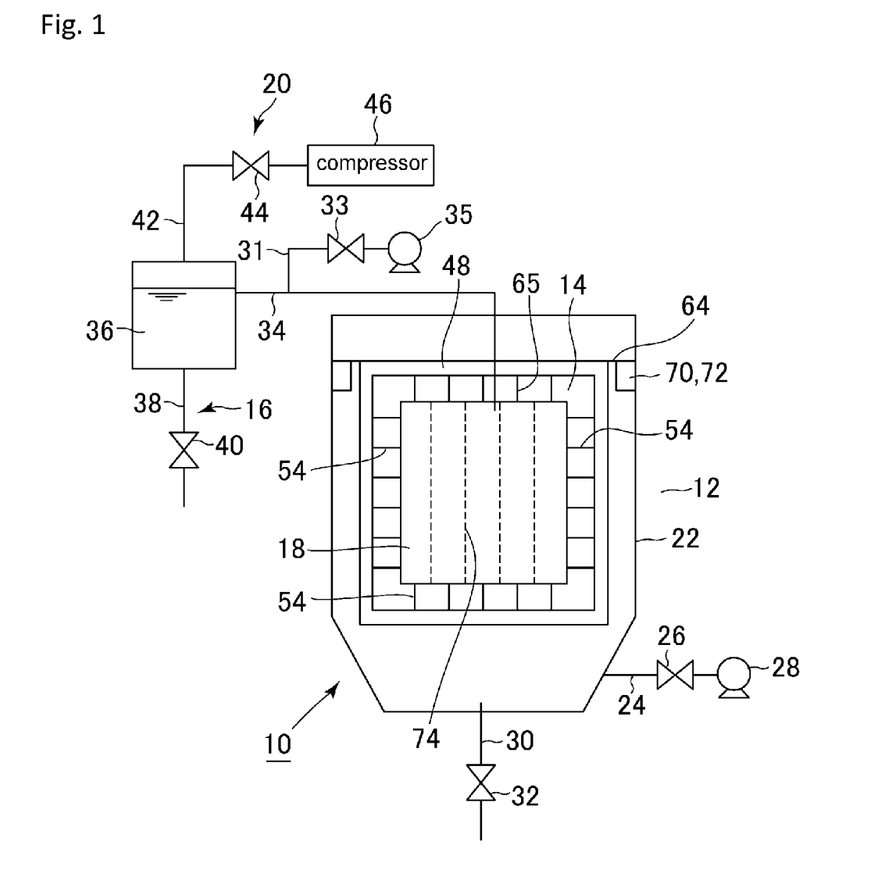
FIG. 1 is a general view showing a filtering and condensing apparatus of a suction type in the first embodiment of the present invention.

As shown in FIG. 1, a filtering and condensing apparatus 10 generally comprises a sludge tank 12 for containing sludge which is to be filtered and condensed, a plurality of filtering plates 14 disposed to be within the sludge tank 12, a suction portion 16 for sucking the sludge, and an expanding portion 20 for expanding a filtering cloth 18 provided on each of the filtering plates 14.

The sludge tank 12 is a container including a bottom with a rectangular cross section and includes a volume so as to house the plurality of the filtering plates 14 which are described below. One end of a sludge supply/discharge tube 24, which supplies the sludge to the sludge tank 12, is communicated with a sidewall 22 of the sludge tank 12, and a sludge supply/discharge pump 28 which can be reversibly operated is provided via a sludge supply/discharge valve 26 provided on an intermediate part of the sludge supply/discharge tube 24. This causes the sludge to be supplied to the sludge tank 12 by opening the sludge supply/discharge valve 26 and operating a sludge supply/discharge pump 28, while causes the non-condensed sludge to be discharged from the sludge tank 12 by reversibly operating the sludge supply/discharge pump 28. In addition, one end of a condensed sludge discharge tube 30, which discharges the condensed sludge deposited on the bottom of the sludge tank 12, is communicated with the bottom portion of the sludge tank 12 and a condensed sludge discharge valve 32 is provided on an intermediate part of the condensed sludge discharge tube 30. The condensed sludge deposited on the bottom of the sludge tank 12 is discharged outside due to the force of gravity via the condensed sludge discharge tube 30 by opening the condensed sludge discharge valve 32.

Figure 2:
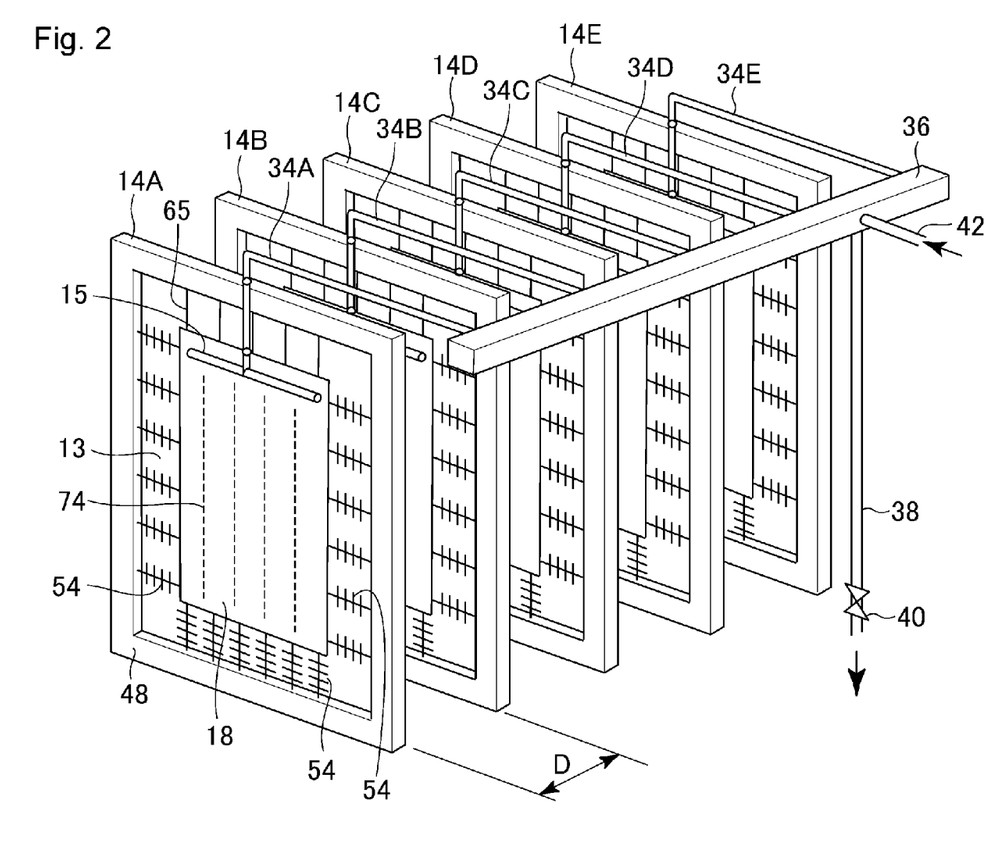
FIG. 2 is a general partial perspective view showing a situation in which a plurality of filtering plates are disposed to be adjacent from each other, in the filtering and condensing apparatus of the suction type in the first embodiment of the present invention.

As shown in FIG. 2, the plurality of the filtering plates 14(14A to 14 E) are aligned with each other in the sludge tank 12 in such a way that their plane portions 13 extend in the vertical direction and the adjacent filtering plates 14 are spaced apart from each other with a predetermined distance D. The smaller the distance D between the adjacent filtering plates 14 becomes, the higher the number of the filtering plates 14 which can be housed within the sludge tank 12 becomes, whereby the total filtering area can be increased accordingly. However, as described below, it is necessary to expand the filtering cloth 18 in order to separate the condensed sludge deposited on the filtering cloth 18 from the corresponding filtering plate 14. Since the filtering cloth 18 protrudes toward the adjacent filtering plate 14 due to the expansion of the filtering cloth 18, there is a risk that the filtering cloth 18 can contact the adjacent filtering plate 14, so that the filtering area cannot be effectively utilized. Such being the case, the distance between the adjacent filtering plates 14 may be determined, in view of the condition that the adjacent filtering plates 14 remain in non-contact, while the total filtering area is maximized.

Each of the plurality of the filtering plates 14 is connected at its upper portion to a filtrate reservoir 36 disposed to be outside of the sludge tank 12 via a distribution tube 34. One end of a filtrate discharge tube 38 is connected to the filtrate reservoir 36 and a filtrate discharge valve 40 is provided on an intermediate part of the filtrate discharge tube 38 extending downwardly.

Each of the distribution tubes 34 and the filtrate discharge tube 38 are connected in a U-shaped manner via the filtrate reservoir 36, so that the filtrate which has been filtered within the sludge tank 12 is discharged outside based on siphon-age. In addition, a suction tube 31 is branched from each of the distribution tubes 34 and a vacuum pump 35 is connected to the suction tube 31 via a suction valve 33 provided on an intermediate part thereof. This causes the liquid within the sludge tank 12 to be treated to be sucked to the distribution tubes 34 by operating the vacuum pumps 35 while the suction valves are open, whereby a preparation for discharging the filtrate outside via the filtrate discharge tube 38 based on the siphon-age can be carried out.

On the other hand, one end of an air supply tube 42 is connected to the filtrate reservoir 36 and a compressor 46 is connected to the air supply tube 42 via an air supply valve 44 provided on an intermediated part thereof. This causes compressed air to be supplied to a filtering chamber 76 of each of the filtering plates 14 via the air supply tube 42, the filtrate reservoir 36 and the corresponding distribution tube 34 by operating the compressor 46 while the air supply valve 44 is open, whereby the corresponding filtering cloth 18 can be expanded in a case where the condensed sludge which is described below is separated from said filtering cloth 18. In this connection, one end of each of the distribution tubes 34 is connected to a horizontal tube 15 provided on the upper portion of the corresponding filtering plate 14, and an outlet opening (not shown) is provided on the lower portion of the horizontal tube 15 at every zone of the corresponding filtering cloth 18 which is divided by seams 74 adjacent to each other which is described below. This causes the compressed air to be fed to every zone of the filtering cloth 18 by the compressor 46 via the corresponding outlet opening or causes the siphoning type suction to be effected by the vacuum pump 35.

Since the structures of the plurality of the filtering plates 14 are the same, the structure of one of the filtering plates will be described below.

Figure 3:
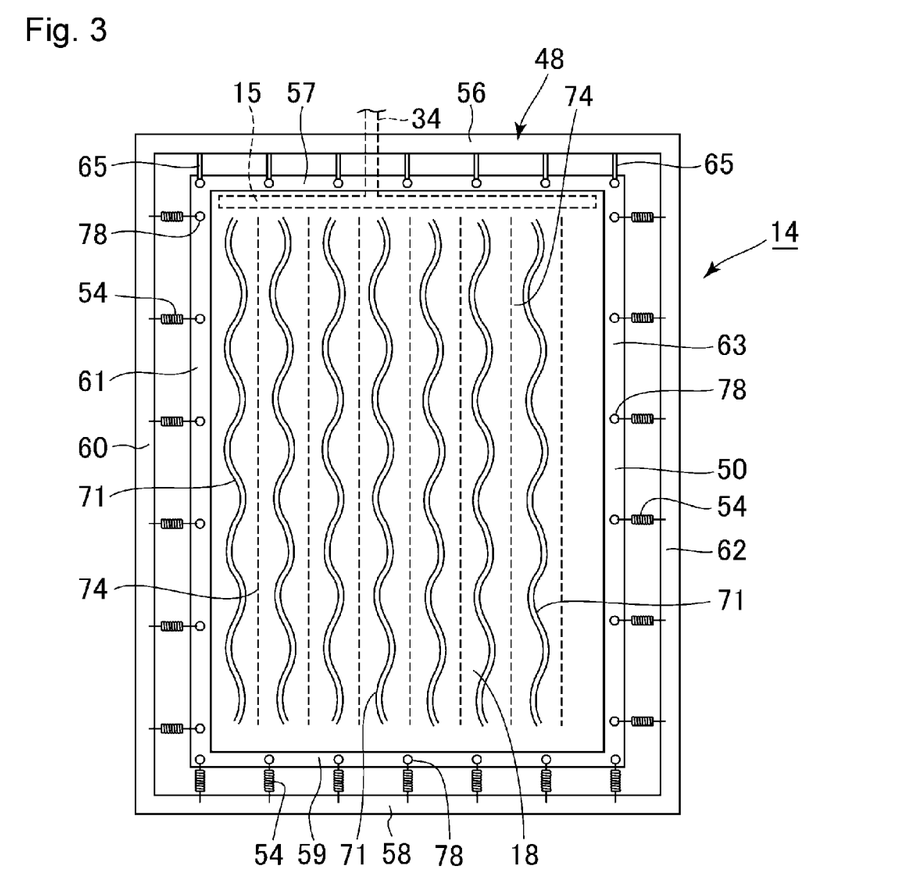
FIG. 3 is a general side view showing a filtering plate in the filtering and condensing apparatus of the suction type in the first embodiment of the present invention.
Figure 4:
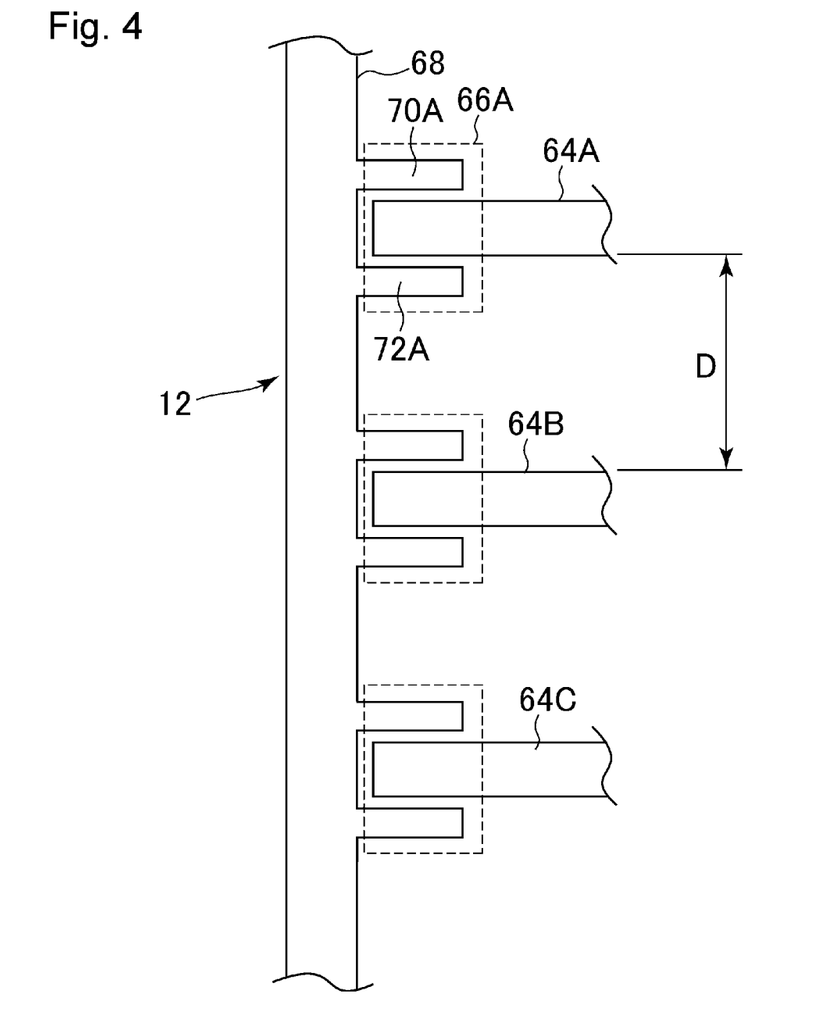
FIG. 4 is a partial plane view showing a situation in which a plurality of filtering plates are suspended and supported from the sludge tank, in the filtering and condensing apparatus of the suction type in the first embodiment of the present invention.

As shown in FIG. 3, the filtering plate 14 generally comprises a filtering frame 48, a supporting plate 50 disposed to be inside of the filtering frame 48, the filtering cloth 18 in a bag form inside of which the supporting plate 50 is housed, a plurality of coil springs 54 provided between the filtering frame 48 and the supporting plate 50. The filtering frame 48 is shaped to be hollow and rectangular and includes an upper side 56, a lower side 58 and lateral sides 60, 62 between the upper side 56 and the lower side 58. The filtering plate 14 is suspended and supported from an inner side surface 68 of the sludge tank 12 by both end portions of the upper side 56. More specifically, as shown in FIG. 4, an extension 64 is provided on each of both end portions of the upper side 56, while a pair of guide plates 70, 72, each of which protrudes towards inside, are provided on the inner side surface 68 of the sludge tank 12, so that an engaging plate 66 fixed on the upper surface of the extension 64 is adapted to rest on the upper surface of the pair of the guide plates 70, 72 by disposing the end portion of the extension 64 to be between the pair of guide plates 70, 72. This causes each of the filtering plates 14 to be suspended from the sludge tank 12. The distance between the adjacent filtering plates 14 is determined by selecting the pair of guide plates 70, 72 from which the filtering plates 14 are suspended. Such a distance may be varied by selecting the pair of guide plates 70, 72 in accordance with the amount of condensed sludge deposited on the filtering cloth 18, the value of the negative pressure caused by the suction, and the lateral length of the zone of the filtering cloth 18 which is described below, for instance.

The supporting plate 50 is in the form of a net or mesh and is rectangular-shaped. Innumerable fine holes are provided on the supporting plate 50. A plurality of flow paths of the filtrate, each of which extends in the vertical direction of the supporting plate 50 are formed between the concave portion of the supporting plate 50 and the inner surface of the corresponding filtering cloth 18 by the fact that concave and convex portions (not shown) vertically extending are provided on the surface of the supporting plate 50. The supporting plate 50 is made of resin, and in particular, it is preferable that the supporting plate 50 has characteristics such that it neither extends in a plane of the supporting plate 50, nor is deformed to deteriorate a flatness of the supporting plate 50 due to the fact that the filtering cloth 18 is immersed into the sludge, and furthermore, it neither contracts in a plane of the supporting plate 50 nor is deformed to deteriorate the flatness of the supporting plate 50 due to the fact that the filtering cloth 18 is expanded. More specifically, the supporting plate 50 is preferably made of polyethylene or ethylene vinyl acetate (EVA). In a case where the filtering cloth 18 is immersed into the sludge for a long time, or the filtering cloth is expanded, a tension force applied to the filtering plate 14 by the coil spring 54 which is described below can be maintained to be substantially constant by adopting such material.

The filtering cloth 18 is preferably made of chemical fiber, more preferably, nylon. The filtering cloth 18 may be formed into a bag form by overlapping a pair of rectangular cloth to sew the overlapped peripheral edge portions, or bending a single rectangular cloth so as to overlap the opposed edge portions to sew the peripheral edge portions. A plurality of eyelets 78 are provided on the periphery of the filtering cloth 18 so that one end of the coil spring 54 which is described below can be hooked by the corresponding eyelet 78.

A plurality of seams 74, each of which vertically extends, are provided on the filtering cloth 18, and the filtering cloth 18 is integrally sewed on the supporting plate 50 which is housed in the filtering cloth 18. This causes the filtering cloth 18 to be divided along the lateral direction (the direction perpendicular to the vertical direction of the sludge tank 12), thereby causing the filtering chamber 76 to be formed between the inner surface of the filtering cloth 18 and the supporting plate 50 at each divided zone (refer to FIG. 5). The distances between the adjacent seams 74 do not have to be the same, however, it is preferable that such a distance be determined in view of the fact that the total filtering area of the whole filtering plates 14 is maximized by disposing the filtering plates 14 to be as close as possible, while causing no risk of contact of the adjacent filtering plates 14.

More specifically, as shown in FIG. 5(A), in order to separate the condensed sludge from the filtering cloth 18, by feeding a compressed air into the corresponding filtering chamber 76 by the compressor 46, in a case where the filtering cloth 18 is expanded, the filtering cloth 18 is caused to protrude toward the adjacent filtering plate. However, such a protrusion P can be decreased by dividing the filtering cloth 18 in the lateral direction and expanding each divided zone, whereby the distance D can be shortened.

Figure 5:
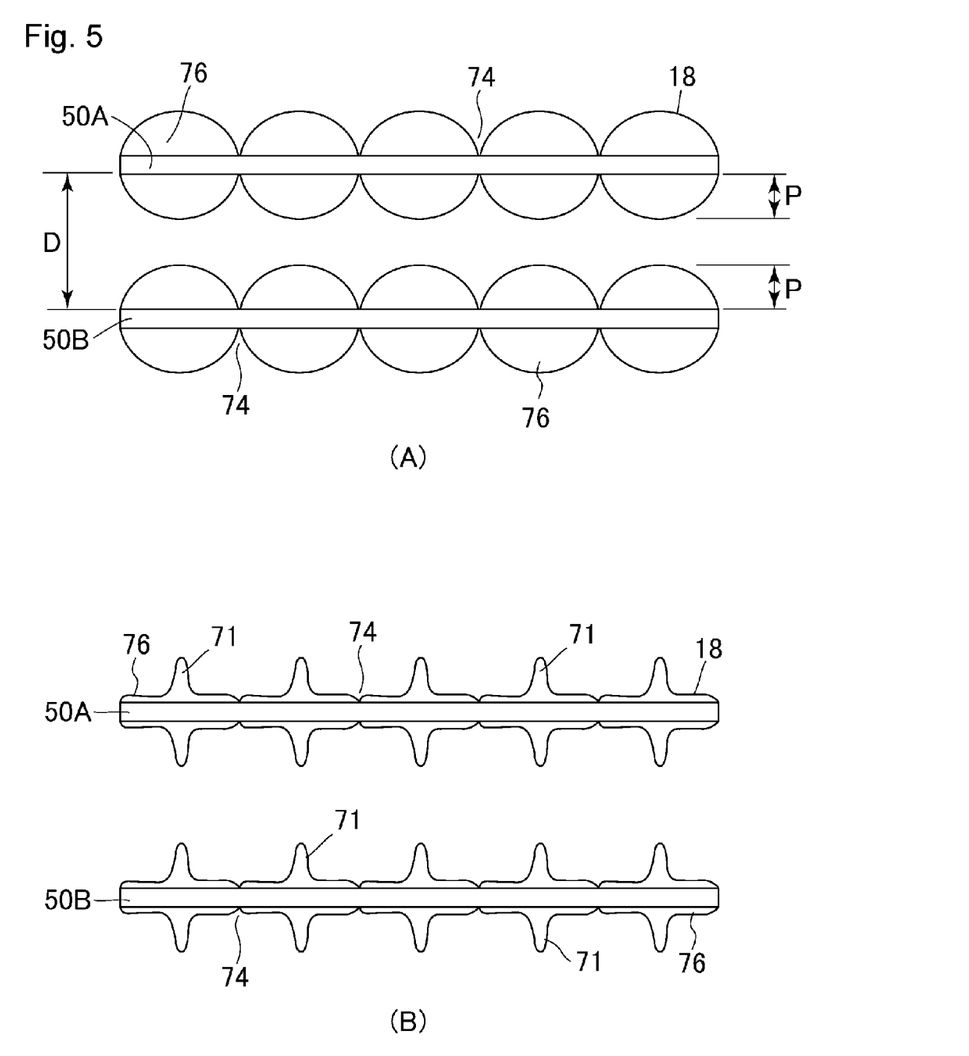

In addition, the lateral length of the filtering cloth 18 is set to be longer than that of the corresponding supporting plate 50 at every zone which is divided by the adjacent seams 74 of the filtering cloth 18 over the entire vertical length of the filtering cloth 18. This causes an expanding margin to be provided at every zone in a case where the filtering cloth 18 is expanded. As shown in FIG. 5 (B), in case of filtering, most of the filtering cloth 18 is adhered to the surface of the corresponding supporting plate 50 by the fact that the filtering cloth 18 is sucked by the filtering chamber 76, a wrinkled portion 71 which is not adhered to the supporting plate 50 is formed along the vertical direction of the supporting plate 50. On the other hand, in a case where the filtering cloth 18 is expanded, the forfeit of the normal filtering function of the filtering cloth 18 or the break or the tearing of the filtering cloth 18 due to the fact that the fine holes of the filtering cloth 18 are enlarged can be prevented in advance without the filtering cloth 18 being excessively tensioned.

As shown in FIG. 3, a plurality of coil springs 54 are provided between the lateral side 60 of the filtering frame 48 and the lateral side 61 of the corresponding filtering cloth 18, the lateral side 62 of the filtering frame 48 and the lateral side 63 of the filtering cloth 18, and the lower side 58 of the filtering frame 48 and the lower side 59 of the filtering cloth 18. A distance between the adjacent coil springs 54 provided on both side portions and the lower side of the filtering frame 48 may be appropriately determined in accordance with the size of the filtering cloth 18, the amount of the condensed sludge deposited on the filtering cloth 18, etc. More specifically, one end portion of each of the coil springs 54 is hooked by the eyelets 78 of the filtering cloth 18, while the other end thereof is fixed to the lateral sides 60, 62 or the lower side 58 of the filtering frame 48.

On the other hand, a plurality of connecting members 65 are provided between the upper side 56 of the filtering frame 48 and the upper side 57 of the corresponding filtering cloth 18. One end of each of the connecting members 65 is hooked by the eyelet 78 of the corresponding filtering cloth 18, while the other end thereof is fixed on the upper side 56 of the filtering frame 48. The connecting members 65 may preferably consist of suspending metal fittings such as shackles.

According to the above structure, a tension force is always applied to the entire periphery including the upper, the lower, and the both lateral sides of each of the filtering plates 14 to keep the filtering plate 14 stable, and as a result, in a case where the filtering in a suction manner is conducted, for instance, the condensed sludge deposited on the filtering cloth 18 can be prevented from being spontaneously separated from the filtering cloth 18, or the filtering plate 14 can be prevented from contacting the adjacent filtering plate 14 due to the fact that the filtering plate 14 can flutter or shake, whereby the situation in which the filtering area cannot be effectively utilized can be prevented. A plurality of coil springs 54 may preferably be made of SUS, from the corrosion resistant point of view, and may preferably be standard products, not made-to-order products, since tens of coil springs are disposed to be around the periphery of the filtering plate 14, and tens of filtering plates 14 are used.

Now, the operation of the filtering and condensing apparatus of the suction type 10 including the above structure will be described.

Firstly, the sludge is fed to the sludge tank 12. More specifically, the sludge supply/discharge valve 26 is opened while the sludge discharge valve 32 is closed, and then the sludge supply/discharge pump 28 is actuated, so that the sludge which is to be filtered and condensed is fed into the sludge tank 12 up to a level which corresponds to a top portion of the filtering plate 14 via the sludge supply/discharge tube 24.

Then, the preparation for filtering and condensing the sludge in the sludge tank 12 in a siphoned manner is carried out. More specifically, the suction valve 33 is opened and the vacuum pump 35 is actuated, so that the liquid in the filtering cloths 18 is sucked into the filtrate reservoir 36 via the distribution tubes 34. The filtrate guided into the filtering chambers 76 can be discharged outside via the sludge discharge tube 38 by the siphon-age in accordance with the difference between the level of the end portion at the side of the filtering plate 14 of each of the distribution tubes 34 and the level of the filtrate reservoir 36.

Then, the sludge in the sludge tank 12 is filtered and condensed. More specifically, the sludge in the sludge tank 12 is sucked toward the outer surface of each of the filtering cloths 18 by the siphon-age. At this stage, water contained in the sludge passes through the filtering cloths 18 and is guided into the filtering chambers 76 as filtrate, while the sludge is dehydrated, so that the condensed sludge is deposited on the outer surfaces of the filtering cloths 18. Since the margin for expanding the filtering cloth is provided at every zone of each of the filtering clothes 18, most of the filtering cloth 18 in every zone is caused to be adhered to the corresponding supporting plate 50 due to the fact that the filtering cloth 18 is sucked, while the portion 71 which is not adhered to the supporting plate 50 is formed into a wrinkle extending in the vertical direction of the filtering cloth 18. Since this wrinkled portion 71 is formed at every divided zone at every time the sludge is filtered, there is a small tendency that this can badly influence on an integrity of the filtering cloth 18, however, a kind of tendency is formed on the filtering cloth 18 by using the filtering cloth 18 for a long time, so that the wrinkled portion 71 can be formed on the same position every time the sludge is filtered. In such a case, it is possible to prevent such a bad influence on the filtering cloth 18 due to the formation of the wrinkled portion 71 by regulating the negative pressure generated in the filtering chamber 76, for instance.

Since a tension force is constantly applied to each of the filtering plates 14 from its periphery, each of the filtering plates 14 is maintained to be stable. This causes the condensed sludge deposited on the outer surfaces of the filtering cloths 18 to be prevented from being separated from the outer surfaces of the filtering cloths 18 due to the fluttering or the shaking of the filtering plates 14.

Then, non-condensed sludge in the sludge tank 12 is discharged outside from the sludge tank 12. More specifically, the sludge supply/discharge valve 26 is opened and the sludge supply/discharge pump 28 is reversely actuated with respect to the case where the sludge is fed, so that the non-condensed sludge in the sludge tank 12 can be discharged outside via the sludge supply/discharge tube 24.

Then, the condensed sludge deposited on the filtering cloths 18 can be separated from the filtering cloths 18 by expanding the filtering cloths 18. More specifically, the air supply valve 44 is opened and the compressed air is fed into the filtering chamber 76 of each of the filtering plates 14 from the compressor 46 through the air supply tube 42, the filtrate reservoir 36, the corresponding distribution tube 34 and the corresponding horizontal tube 15. This causes each of the filtering cloths 18 whose innumerable fine holes are closed by the condensed sludge to be expanded in the direction in which each of the filtering cloths 18 is away from the corresponding supporting plate 50. In such a case, since the expanding margin is provided on every divided zone of the filtering cloth 18, the filtering cloth 18 can be prevented from being excessively tensioned in such a way that the fine holes are forced to be enlarged, or that the filtering cloth 18 is caused to be broken. Further, the supporting plate 50 integrally sewed on the corresponding filtering cloth 18 is subjected to the compressive force due to the expansion of the filtering cloth 18, so that it is forced to be laterally contracted (the lateral direction in FIG. 5). However, the lateral length of the supporting plate 50 can be maintained to be substantially constant due to the rigid supporting plate 50, whereby the tension force by the coil springs 54 transmitted from the side of the supporting plate 50 can be maintained to be substantially constant.

Then, the separated condensed sludge is discharged outside from the sludge tank 12. More specifically, the sludge discharge valve 32 is opened, and then the condensed sludge deposited on the bottom of the sludge tank 12 is discharged outside of the sludge tank 12 via the condensed sludge discharge tube 30 due to the gravity force. The above processes complete the filtering and condensing operation of the sludge.

The filtering cloth 18 tends to swell due to the fact that it is immersed into the sludge for a long time, whereby the corresponding supporting plate 50 is forced to be laterally extended, too (the lateral direction in FIG. 5), however, the lateral length of the supporting plate 50 can be maintained to be substantially constant due to the rigid supporting plate 50, whereby the tension force by the coil springs 54 transmitted from the side of the supporting plate 50 can be maintained to be substantially constant.

The condensed sludge which is discharged outside from the sludge tank 12 is further condensed by another hydrator to be formed into a cake, and then, incinerated or reclaimed.

According to the above filtering and condensing apparatus 10 of the suction type, by sucking and thus filtering the sludge contained in the sludge tank 12 through the filtering cloths 18, water contained in the sludge passes through the filtering cloths 18, and thus guided into the filtering chambers 76, while the sludge is filtered and thus condensed by the dehydrated sludge being deposited on the outer surface of the filtering cloths 18. In this case, since a tension force is always applied to each of the plurality of the filtering plates 14 from its periphery by a means for applying a tension force, each of the filtering plates 14 is maintained to be stable, and thus, in case of suction, for instance, the condensed sludge deposited on the filtering cloths 18 can be prevented from being spontaneously separated by the fluttering of the filtering plate 14, or the formation of the condensed sludge can be prevented from being blocked or the effective filtering area can be prevented from being decreased by the contact of the adjacent filtering plates 14.

In order to separate the condensed sludge from the filtering cloth 18, in a case where the filtering cloth 18 is expanded, since the filtering cloth 18 is divided in the lateral direction of the filtering plate 14, the amount of the protrusion of the expanding portion toward the adjacent filtering plate 14 can be restricted due to the fact that the filtering cloth 18 is expanded at each divided zone, whereby, as compared with the case where the filtering cloth 18 is not divided, the adjacent filtering plates 14 can be disposed to be closer to each other, and as a result, the total filtering area constituted by the plurality of the filtering plates 14 can be maximized.

In such a case, since the expanding margin is provided at every divided zone, in a case where the filtering cloth 18 is expanded, the normal filtering function can be prevented from being lost, or the filtering cloth 18 can be prevented from being broken or torn due to the fact that the filtering cloth 18 is unduly tensioned to enlarge fine holes of the filtering cloth 18. As such, the filtering efficiency can be improved, while at the same time an integrity of the filtering cloth 18 can be maintained.

Further, since the filtering cloth 18 is integrally sewed on the corresponding supporting plate 50, a compressive force in the lateral direction of the supporting plate 50 is applied to the supporting plate 50 when the filtering cloth 18 is expanded. However, since the supporting plate 50 is made of a rigid material which causes substantially no contraction in its plane, and substantially no deformation so as to deteriorate its flatness due to the expansion of the filtering cloth 18, the length of the supporting plate 50 can be maintained to be substantially constant without causing the lateral contraction due to such a compressive force. Accordingly, since the length of the elastic member also remains unchanged, the tension force by the elastic member can be maintained to be substantially constant, so that the contact of the adjacent filtering plates 14 or the fluttering of the filtering plate 14 due to the decrease of the tension force caused by the extension of the elastic member can be prevented.

On the other hand, in a case where the filtering cloth 18 is swollen due to the fact that the filtering cloth 18 is immersed into the sludge for a long time, a tension force is applied to the supporting plate 50 in its lateral direction due to the expansion of the filtering cloth 18. However, since the supporting plate 50 is made of a rigid material which causes substantially no extension in its plane, and substantially no deformation so as to deteriorate its flatness due to the immersion of the filtering cloth 18 into the sludge, the length of the supporting plate 50 can be maintained to be substantially constant without causing the lateral extension due to such a compressive force. Accordingly, since the length of the elastic member also remains unchanged, the tension force by the elastic member can be maintained to be substantially constant, so that the enlarging of the fine holes of the filtering cloth 18 or the break of the filtering cloth 18 due to the increase of the tension force caused by the contraction of the elastic member can be prevented.

In particular, in a case where the filtering and condensing apparatus 10 of the suction type is made large-sized, the fluctuation of the tension force applied to the supporting plate 50 upon the filtering is inevitably increased. However, by utilizing cheap standard elastic members without a need to prepare for expensive made-to-order elastic members, the plurality of filtering plates 14 can be disposed to be as close as possible to each other, while the filtering area of each of the filtering plates 14 can be maximized and the fluctuation of the tension force applied to the filtering plate 14 upon the filtering can be restricted, whereby the above technical problems caused by the expansion of the filtering cloth 18 or the immersion of the filtering cloth 18 for a long time can be solved.

Figure 6:
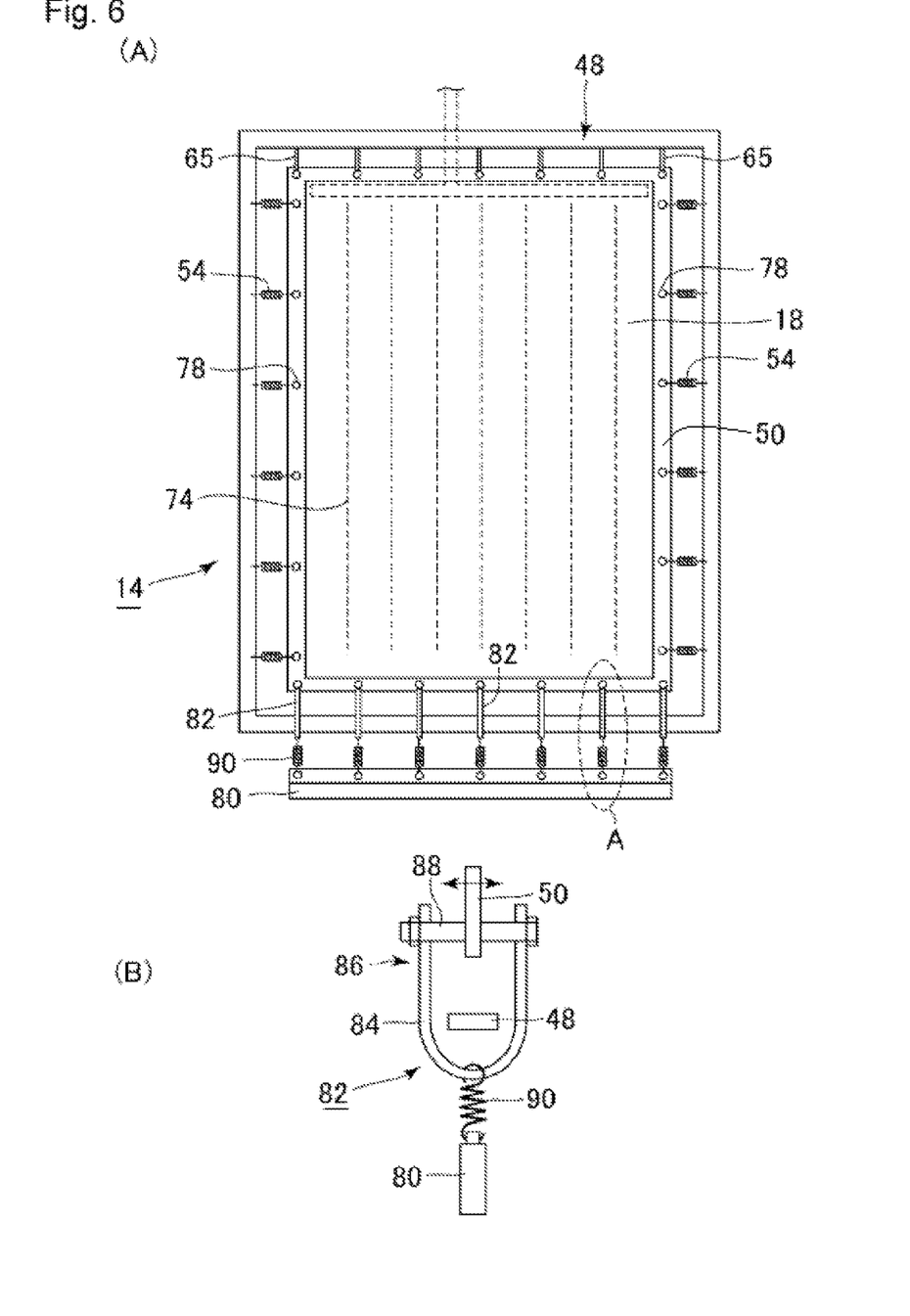

Now, the second embodiment of the present invention will be described. In the following description, the explanation of elements the same as those in the first embodiment is omitted by attaching the same reference numbers to said elements, and the technical feature of this embodiment will be described in detail. FIG. 6 is an illustration in the filtering and condensing apparatus of the suction type in the second embodiment the same as FIG. 3 in the first embodiment.

As shown in FIG. 6 (A), the technical feature of this embodiment lies in the fact that, in each of the filtering plate 14, a weight member 80 is provided on its lower portion. More specifically, the weight member 80 with a predetermined weight including a laterally elongated prism shape, is suspended from the lower portion of each of the filtering plates 14 via a plurality of suspending metal fittings 82. As shown in FIG. 6 (B), each of the suspending metal fittings 82 includes a U-shaped body 86 including a pair of extensions 84 parallel to each other and a connecting rod 88 which connects tip ends of the pair of the extensions 84. The weight member 80 is suspended from the corresponding body 86 via a coil spring 90. The plurality of suspending metal fittings 82 are disposed in such a way that the corresponding filtering frame 48 is interposed between the pair of the extensions 84, and connected to the corresponding filtering cloth 18 by introducing the connecting rod 88 into the eyelet 78 of the corresponding filtering cloth 18.

If the coil springs are disposed to be the lower portion of the filtering plate 14 like the first embodiment, the coil springs are forced to be unduly compressed due to the weight of the condensed sludge gradually deposited on the surface of the filtering cloth 18. However, according to the structure of this embodiment, since the filtering cloth 18 can be always downwardly tensioned by means of the weigh member, the filtering cloth 18 can be prevented from being slackened due to the deposition of the condensed sludge on the filtering cloth 18. Further, since the filtering frame 48 is disposed to be interposed between the pair of extensions 84, the corresponding filtering plate 14 can be prevented from excessively being swung toward the adjacent filtering plate 14 due to the fact that said filtering plate 14 contacts the pair of the extensions 84.

As stated above, the preferred embodiments of the present invention were described in detail, however, it is evident that those skilled in the art could modify or change the embodiments in various manners without departing from the scope of the present invention.

For instance, in the first embodiment, the sludge was described to be the object to be filtered and condensed, however, the filtering and condensing apparatus of the suction type of the present invention can be applicable to incineration ash contained in the alkali solution, foreign objects contained in the beverages such as milk, juice, foreign objects in a high turbidity solution, etc., so long as the conditions such as the kind of the filtering cloth, the size of diameter of the fine holes, the suction force, etc. are appropriately set in accordance with the object to be filtered and condensed.

In addition, in the first embodiment, the filtering and condensing apparatus of the siphon type was described, however, the filtering and condensing apparatus of the suction type utilizing a suction pump can be adopted, so long as the negative pressure is appropriately set, taking an influence on the filtering cloth 18 into consideration.

Still further, in the first embodiment, the coil springs 54 were adopted as elastic members, however, rubber plates, etc. can be adopted, so long as the desired tension force can be obtained.

Industrial Applicability

The filtering and condensing apparatus of the suction type of the present invention can be applicable not only to the technical field of the water treatment, but also to that of the food or chemical industry, and, in particular, it is advantageous in a case where the filtering and condensing apparatus of the suction type, which is to be applied to a condensing process of sludge generated during the water treatment at a water purification plant or a sewage disposal plant, is made large.

BRIEF DESCRIPTION OF THE DRAWINGS

FIG. 5 (A) is a conceptual view showing a situation in which the filtering cloths of the adjacent filtering plates are expanded, and FIG. 5 (B) is a conceptual view showing a situation in which the filtering is carried out by the filtering cloths of the adjacent filtering plates, in the filtering and condensing apparatus of the suction type in the first embodiment of the present invention.

FIG. 6 (A) is a view the same as FIG. 3 in the filtering and condensing apparatus of the suction type in the second embodiment of the present invention.

FIG. 6 (B) is a view of a suspended metal fitting (82) from FIG. 6 (A).

EXPLANATION OF REFERENCE NUMBERS

P: amount of protrusion
D: distance
10: filtering and condensing apparatus of suction type
12: sludge tank
14: filtering plate
15: horizontal tube
16: suction portion
18: filtering cloth
20: expanding portion
22: side wall
24: sludge supply/discharge tube
26: sludge supply/discharge valve
30: condensed sludge discharge tube
32: condensed sludge discharge valve
34: distribution tube
35: vacuum pump
36: filtrate storage tank 42: air supply tube
44: air supply valve
46: compressor
50: supporting plate
54: coil spring
56: upper side
58: lower side
60, 62: lateral side
71: non-adhering portion
74: seam
76: filtering chamber
78: eyelet
80: weight member
82: suspending fitting
84: extension
86: body
88: connecting rod
90: spring

What is claimed is:

1. A filtering and condensing apparatus of a suction type comprises
a sludge tank for containing sludge to be filtered and condensed, and
a plurality of filtering plates aligned with each other so as to be disposed to be adjacent to each other in the sludge tank,
each plane portion of which filtering plates extends in a vertical direction, wherein each filtering plate includes
a supporting plate in the form of a net, and
a filtering cloth in a bag form so as to be integrally sewed on the supporting plate and to house said supporting plate, whereby at least one filtering chamber is formed inside the filtering cloth, and
said apparatus further includes
a means for sucking said filtering cloth through said filtering chamber,
a means for expanding said filtering cloth through said filtering chamber, and
a means for constantly applying a tension force to each of the filtering plate, which means is disposed to be over a periphery of each filtering plate, characterized in that
each filtering cloth is divided in a lateral direction of a corresponding filtering plate by a plurality of vertically extending seams to form multiple divided zones, in each of which zone each filtering chamber is formed, and
a lateral length of a portion of each filtering cloth divided by the adjacent seams is set to be longer than a lateral length of a portion of the supporting plate corresponding to a corresponding zone over an entire vertical direction, whereby each zone includes an expanding margin upon the expansion of a corresponding filtering cloth,
said apparatus being further characterized in that
a filtering frame is provided around an outer periphery of each filtering plate so as to surround the filtering plate,
an upper portion of each filtering cloth is suspended and supported from an upper portion of a corresponding filtering frame, and
a weight member is provided below a lower portion of each supporting plate, wherein the weight member is adapted to be suspended from a U-shaped body which is connected to the lower portion of the supporting plate such that the lower portion of the supporting plate and a lower portion of the filtering frame are interposed between two arms of the U-shaped body being oriented upwardly, and the lower portion of the supporting plate is connected to the two arms with a connecting rod, whereby a tension force is applied to the filtering cloth in a downward direction due to the weight member.

2. The filtering and condensing apparatus of a suction type according to claim 1, wherein said means for constantly applying a tension force to each filtering plate from both sides of the filtering plate consists of an elastic member extending in a lateral direction of the filtering plate, said supporting plate is made of a rigid material which causes substantially no extension in a plane of the supporting plate due to the immersion of the filtering cloth into a sludge and substantially no contraction in the plane of the supporting plate due to the expansion of the filtering cloth, and causes no substantial deformation so as to deteriorate a flatness of the supporting plate due to said immersion and said expansion of the filtering cloth.

3. The filtering and condensing apparatus of a suction type according to claim 1, wherein a negative pressure caused by said sucking means is set to be less than a predetermined value in such a way that a wrinkled portion of the filtering cloth which is not adhered to the filtering cloth and is formed based on said expanding margin upon filtering does not deteriorate an integrity of the filtering cloth.

4. The filtering and condensing apparatus of a suction type according to claim 1, wherein the lateral length of said divided zone of each of the filtering cloths is determined in accordance with the amount of a protrusion of the filtering plate toward the adjacent filtering plate upon an expansion of the filtering cloth, and a distance between the adjacent filtering plates.

5. The filtering and condensing apparatus of a suction type according to claim 2, wherein said supporting plate is made of polyethylene.

6. The filtering and condensing apparatus of a suction type according to claim 2, wherein said supporting plate is made of ethylene vinyl acetate (EVA).

7. The filtering and condensing apparatus of a suction type according to claim 2, wherein said elastic member consists of a coil spring made of steel use stainless (SUS).

8. A filtering and condensing apparatus of a suction type comprising
a filtering and condensing tank for containing a liquid including material to be filtered and condensed, and
a plurality of filtering plates aligned with each other so as to be disposed to be adjacent to each other in the filtering and condensing tank,
each plane portion of which filtering plates extends in a vertical direction, wherein each filtering plate includes
a supporting plate in the form of a net, and
a filtering cloth in a bag form so as to be integrally sewed on the supporting plate and to house said supporting plate, whereby at least one filtering chamber is formed inside the filtering cloth, and
said apparatus further includes
a means for sucking said filtering cloth through said filtering chamber,
a means for expanding said filtering cloth through said filtering chamber, and
a means for constantly applying a tension force to each filtering plate, which means is disposed to be over a periphery of each filtering plate, characterized in that
each filtering cloth is divided in a lateral direction of a corresponding filtering plate by a plurality of vertically extending seams to form multiple divided zones, in each of which zone each filtering chamber is formed, and
a lateral length of a portion of each filtering cloth divided by the adjacent seams is set to be longer than a lateral length of a portion of the supporting plate corresponding to a corresponding zone over an entire vertical direction, whereby each zone includes an expanding margin upon the expansion of a corresponding filtering cloth, said apparatus being further characterized in that
- a filtering frame is provided around an outer periphery of each filtering plate so as to surround the filtering plate,
- an upper portion of each filtering cloth is suspended and supported from an upper portion of a corresponding filtering frame, and
- a weight member is provided below a lower portion of each supporting plate, wherein the weight member is adapted to be suspended from a U-shaped body which is connected to the lower portion of the supporting plate such that the lower portion of the supporting plate and a lower portion of the filtering frame are interposed between two arms of the U-shaped body being oriented upwardly, and the lower portion of the supporting plate is connected to the two arms with a connecting rod, whereby a tension force is applied to the filtering cloth in a downward direction due to the weight member.

\* \* \* \* \*